(12) United States Patent
Kukuliyev

(10) Patent No.: US 8,701,649 B2
(45) Date of Patent: Apr. 22, 2014

(54) PORTABLE GRILL

(76) Inventor: Arkadiy Kukuliyev, Suwanee, GA (US)

( * ) Notice: Subject to any disclaimer, the term of this patent is extended or adjusted under 35 U.S.C. 154(b) by 386 days.

(21) Appl. No.: 13/081,846

(22) Filed: Apr. 7, 2011

(65) Prior Publication Data

US 2012/0255542 A1 Oct. 11, 2012

(51) Int. Cl.
*F24C 1/16* (2006.01)
*F24B 3/00* (2006.01)
*A47J 37/07* (2006.01)

(52) U.S. Cl.
USPC ........ 126/9 R; 126/9 B; 126/25 R; 126/25 A; 126/26; 126/29; 99/340; 99/449; 99/450

(58) Field of Classification Search
USPC ..... 126/9 B, 9 R, 25 R, 25 A, 26, 29; 99/340, 99/449, 450
See application file for complete search history.

(56) References Cited

U.S. PATENT DOCUMENTS 2,646,031 A * 7/1953 Wagner .................. 126/9 R
5,105,726 A * 4/1992 Lisker ..................... 99/340

FOREIGN PATENT DOCUMENTS

EP 2319377 A1 * 5/2011 ............. A47J 37/07
WO WO 2010018242 A1 * 2/2010 ............. A47J 37/07

* cited by examiner

*Primary Examiner* — Kenneth Rinehart
*Assistant Examiner* — William Corboy
(74) *Attorney, Agent, or Firm* — Eliezer IP, LLC; Yuri L. Eliezer, Esq.

(57) ABSTRACT

A portable grill may be provided. The portable grill may be quickly assembled and dissembled. The portable grill may be transported in a portable case. The portable grill may support a grill surface or skewers. The portable grill may comprise an adjustable ventilation mechanism.

20 Claims, 15 Drawing Sheets

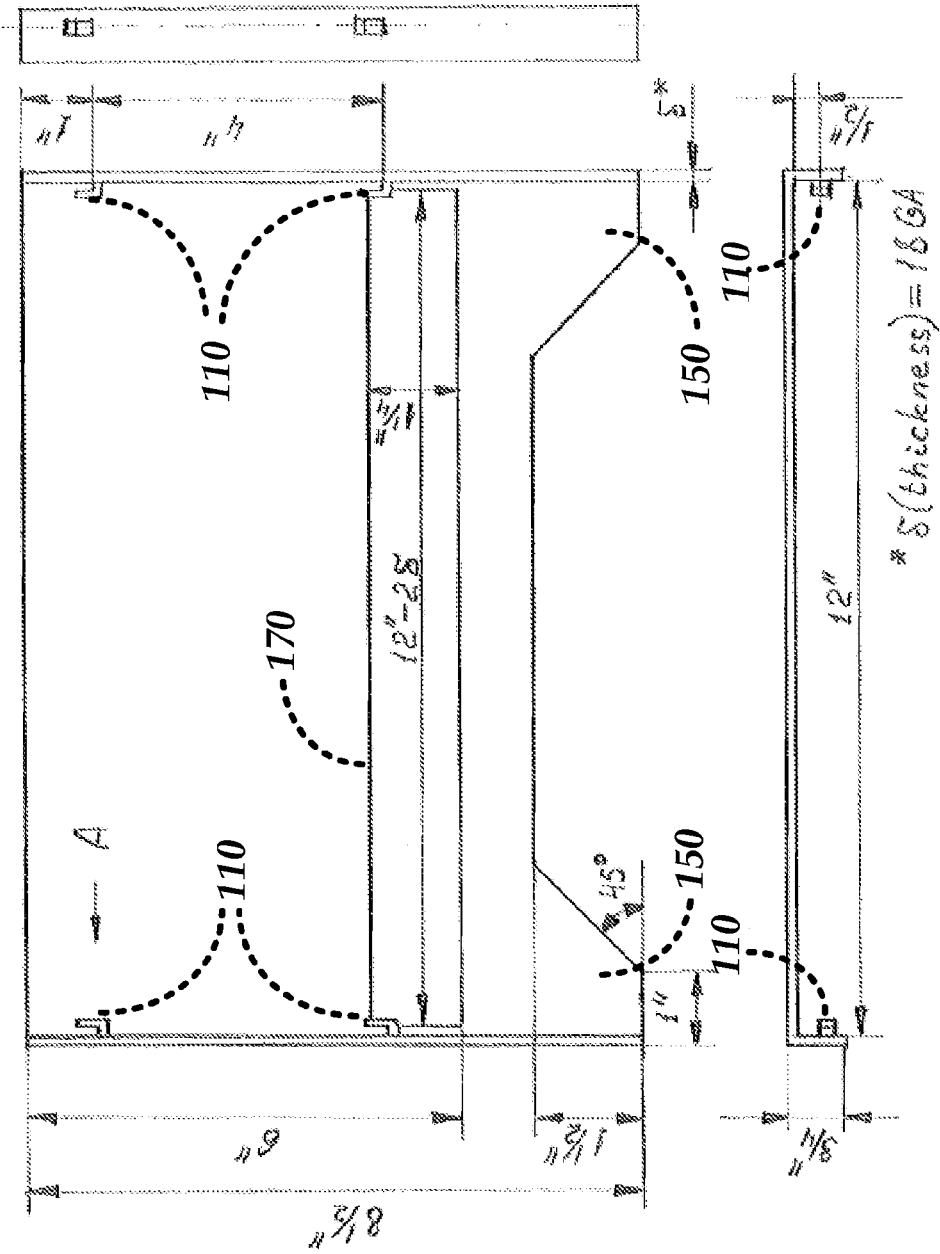

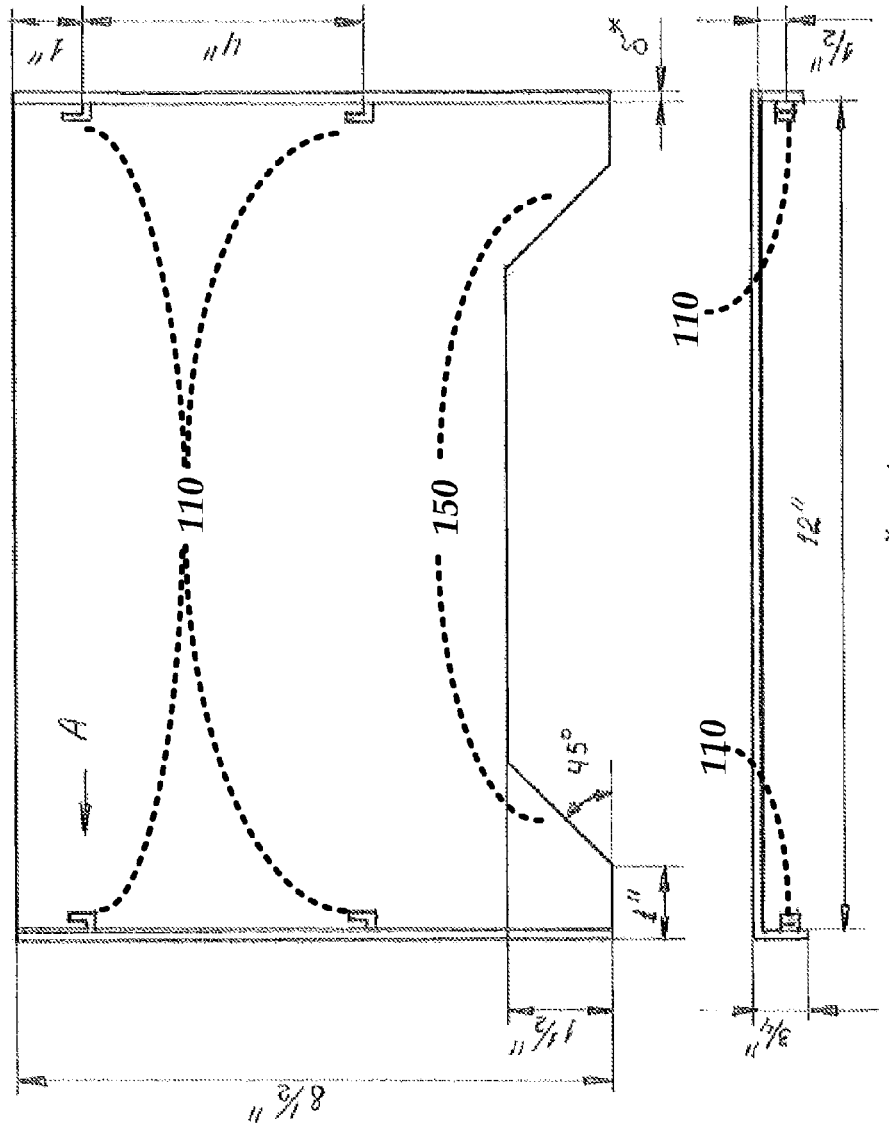

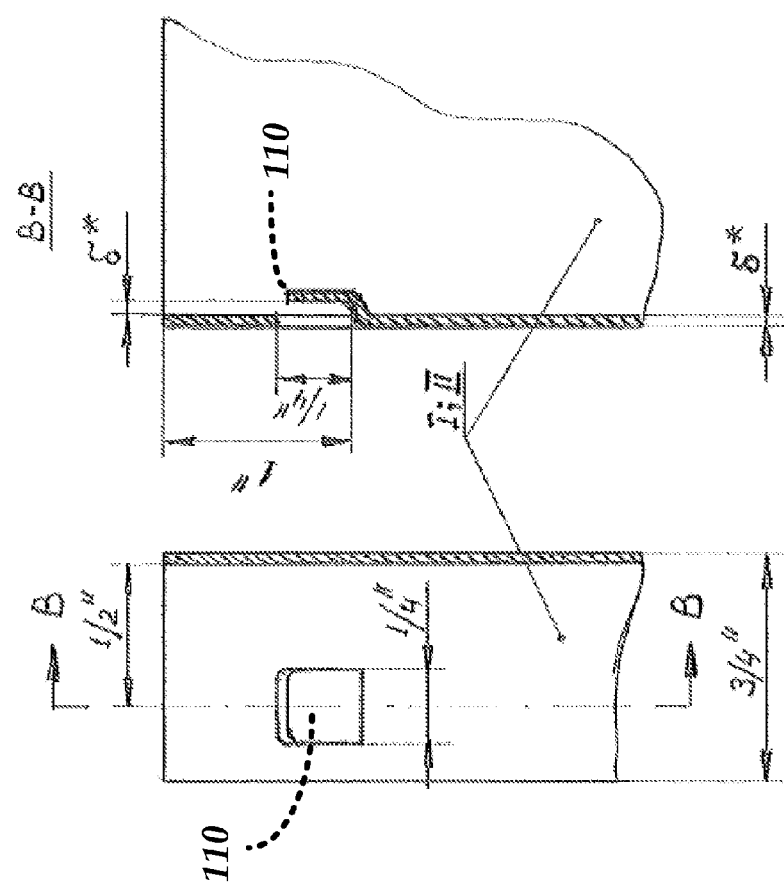

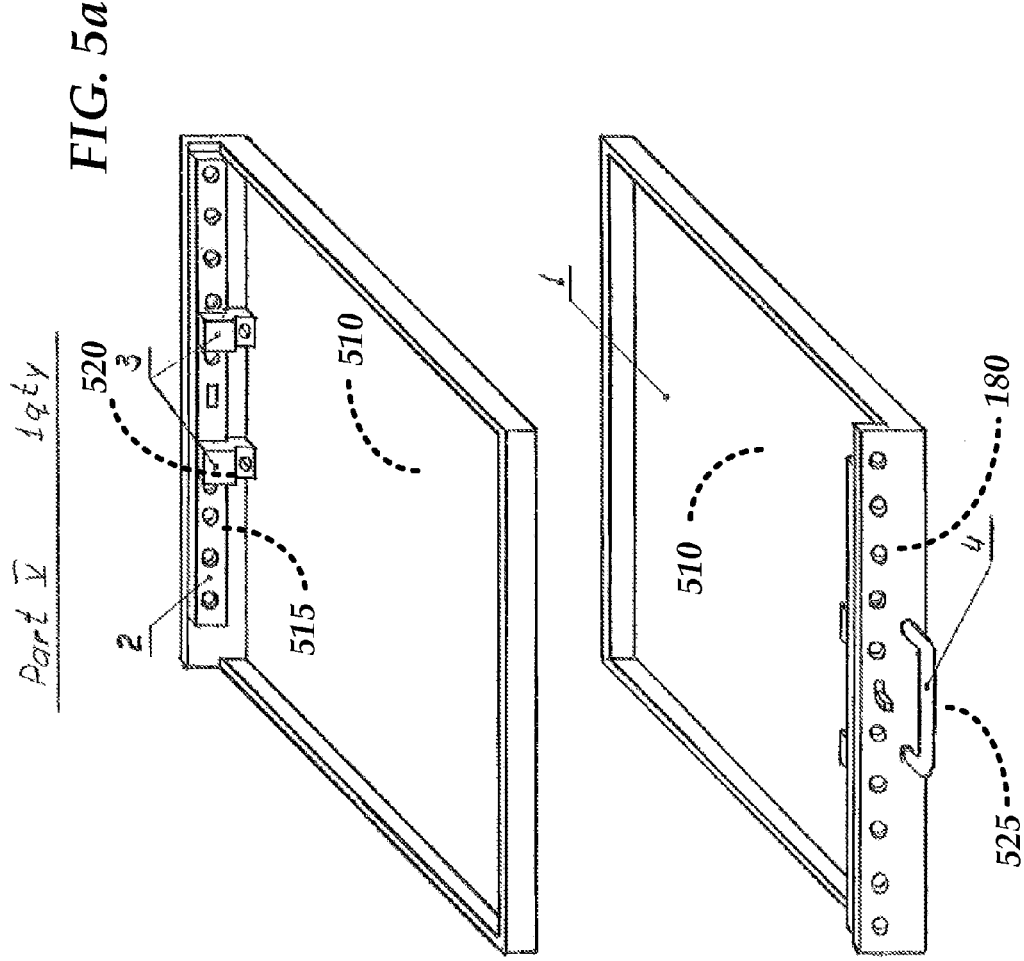

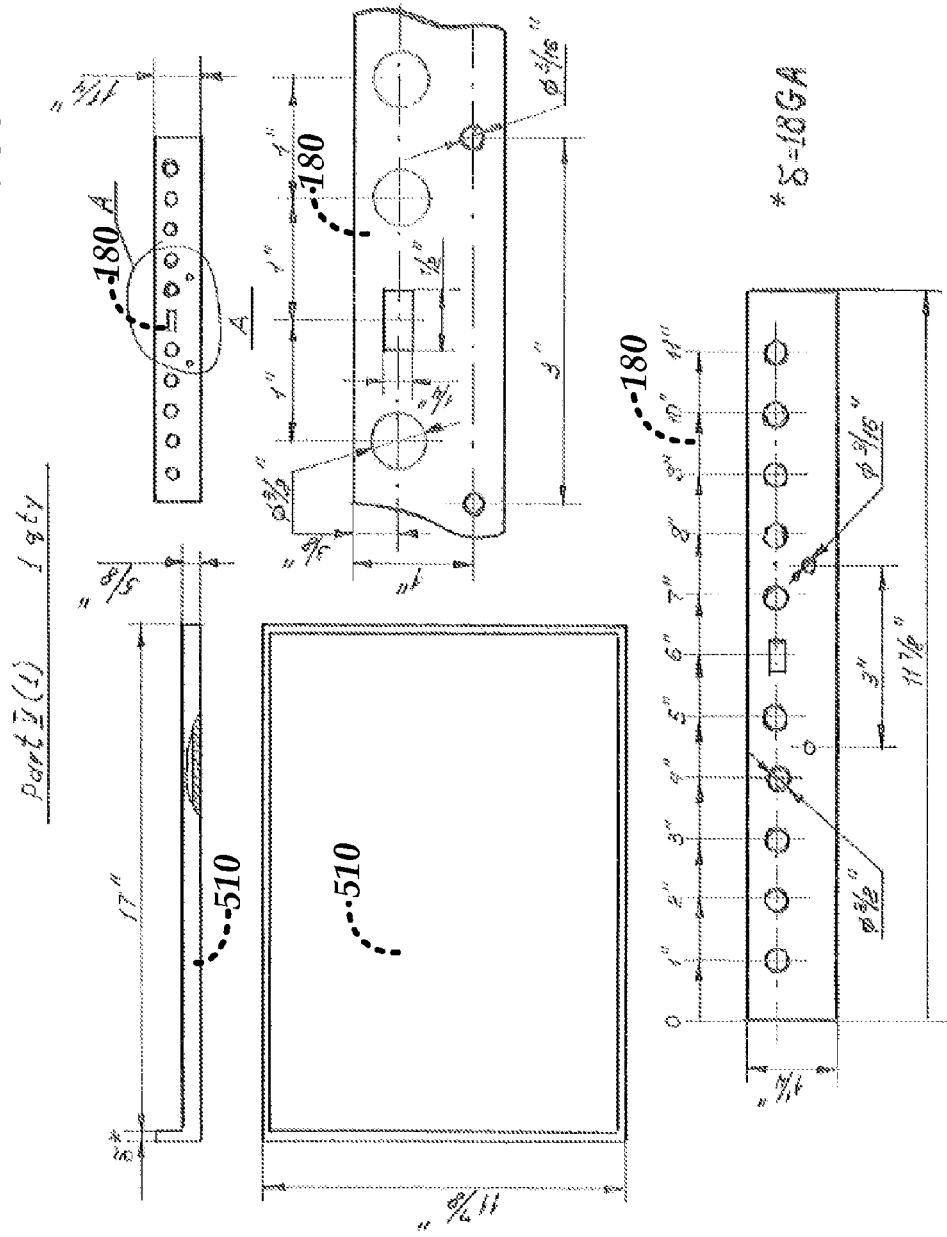

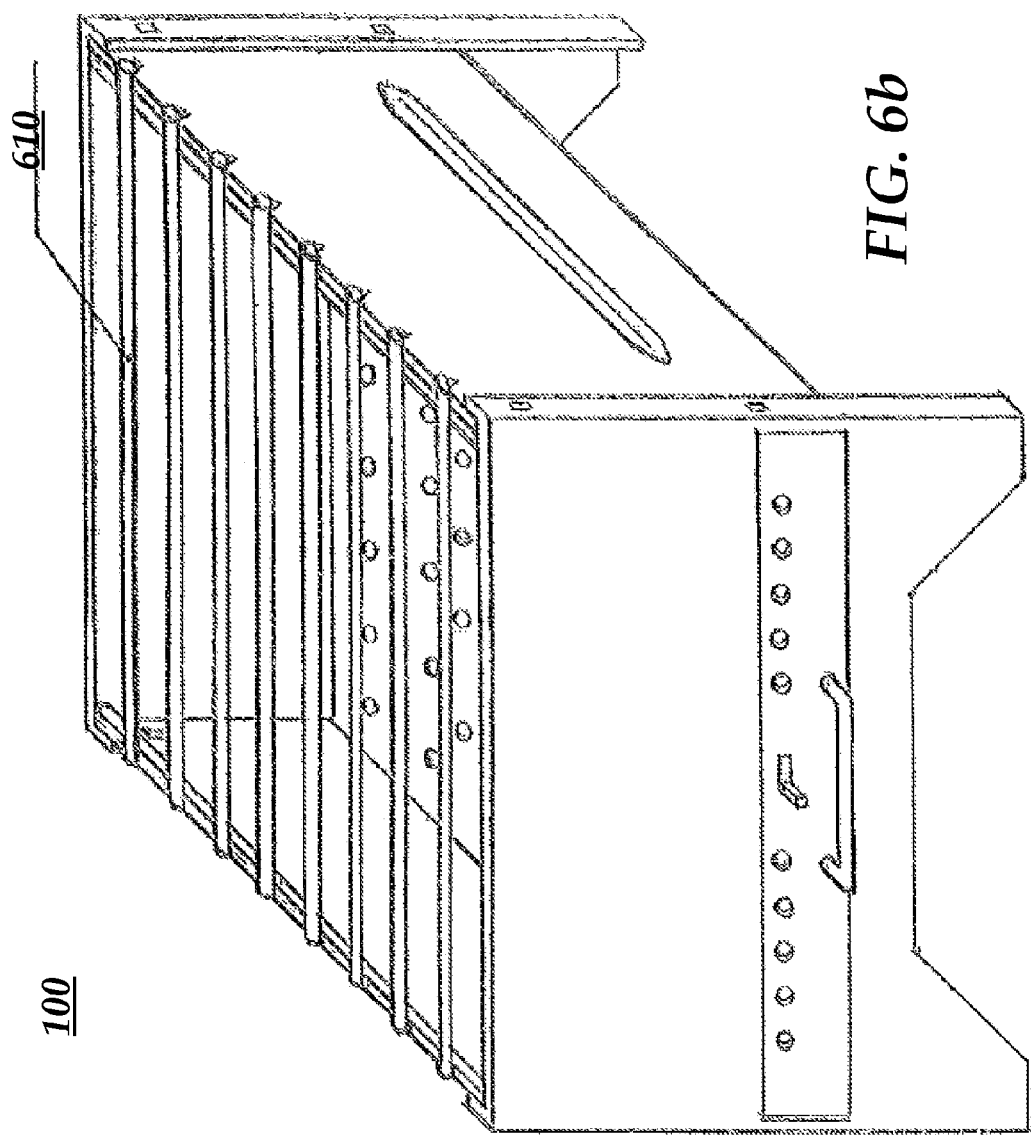

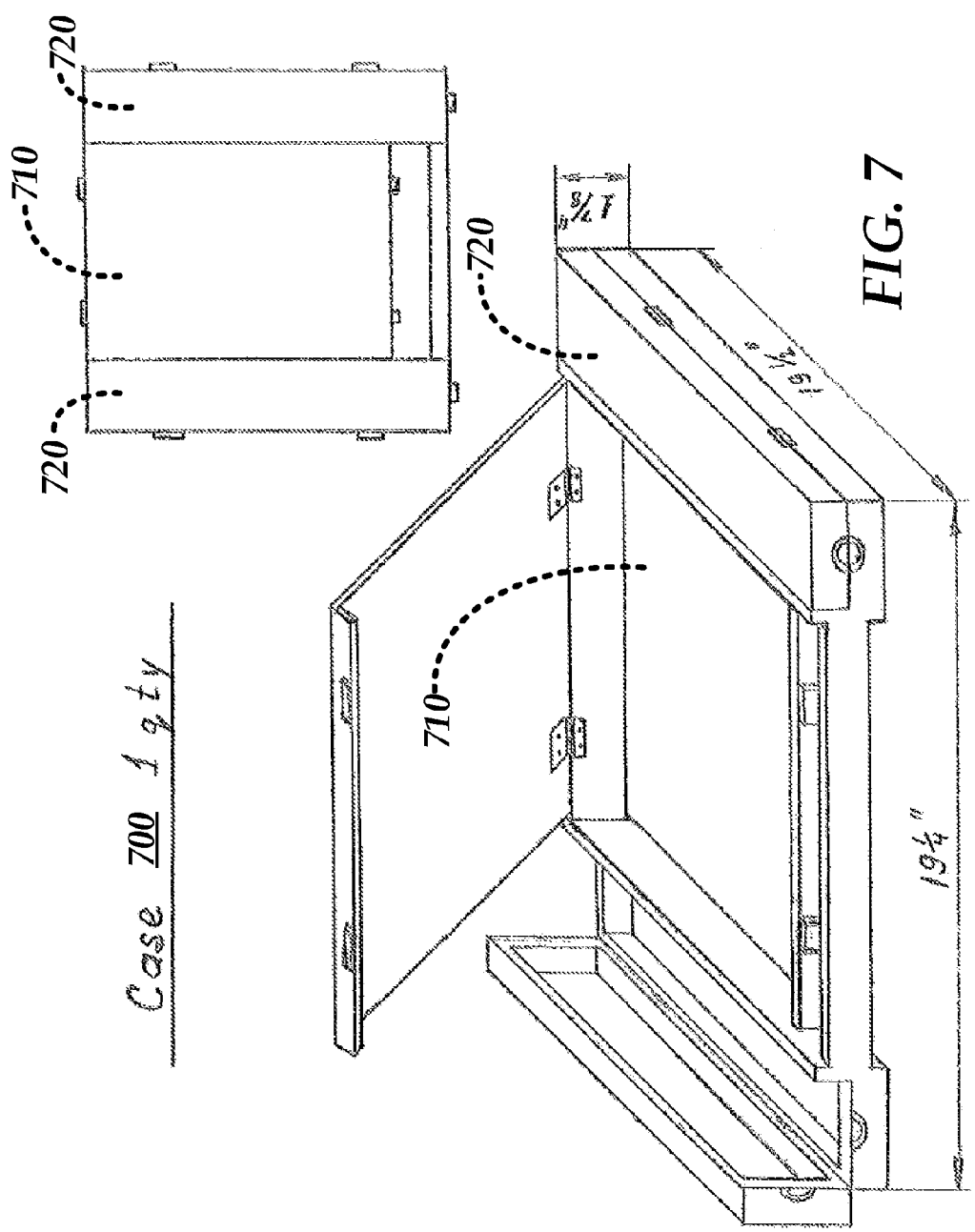

PORTABLE GRILL

BACKGROUND

Grilling is a popular activity across many different cultures. In general, grilling is an outdoor activity. Often times, people gather at parks for picnics and grill on stationary grills provided at the park. However, a grill may not always be publically available. As a result, there is a need for portable grills.

BRIEF DESCRIPTION OF THE DRAWINGS

The accompanying drawings, which are incorporated in and constitute a part of this disclosure, illustrate various embodiments of the present invention. In the drawings:

FIGS. 2a-2d illustrate front and back walls of the portable grill;

FIGS. 5a-5d illustrate a sliding portion of the portable grill;

FIGS. 6a-6b illustrate embodiments of the portable grill; and

FIG. 7 illustrates one embodiment of a case for the portable grill.

DETAILED DESCRIPTION

Figure 1A:
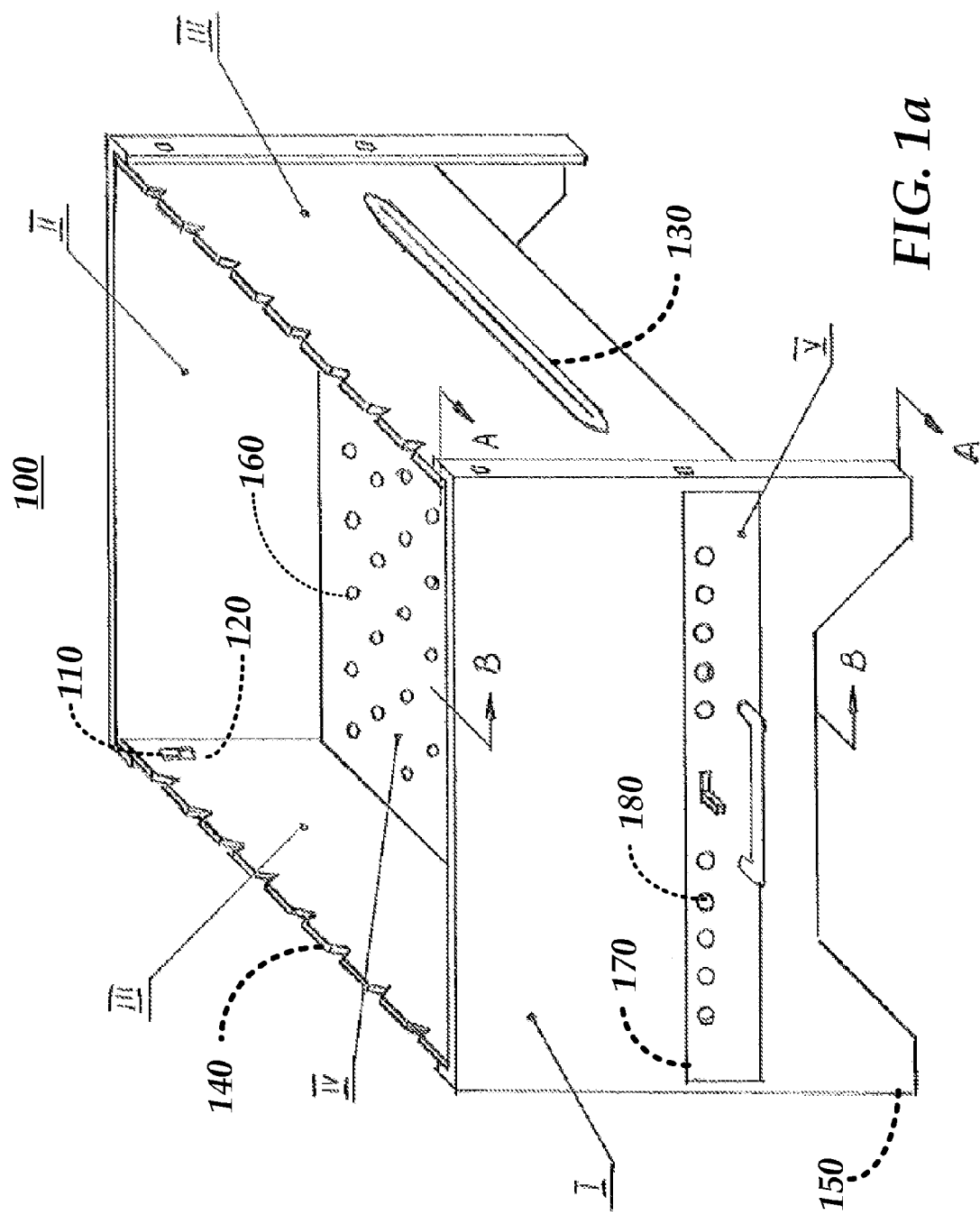
FIGS. 1a and 1b illustrate one embodiment of a portable grill.

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings. Accordingly, the following detailed description does not limit the invention. Instead, the proper scope of the invention is defined by the appended claims.

FIG. 1a illustrates one embodiment of a light-weight, portable grill 100. Portable grill 100 may be quickly assembled and dissembled without the aid of tools. Portable grill 100 may be approximately one foot in width, 17 inches in length, and eight and one half inches in height, though the dimensions may vary and are not to be construed as limiting the various embodiments described herein. The terms 'width', 'length', and 'height', as used throughout the specification, may be interpreted in conjunction with the corresponding dimensions shown in the figures and are not to be construed as limiting the orientation and dimensions of the particular elements that these terms reference.

The materials forming the parts of portable grill 100 may be comprised of any suitable substance at any suitable thickness for grilling. Where available, the figures denote one possible thickness of various embodiments of portable grill 100 with the symbol 'δ'. Rust resistance materials may be used. In this way, portable grill 100 may be dissembled and cleaned in, for example, a dishwasher.

As mentioned above, portable grill 100 may be easily assembled and dissembled. In its dissembled state, walls I and II of portable grill, when placed adjacent to one another, may have their combined width approximately equal to the length of wall III, platform IV, and slide V. Moreover, all of the parts of portable grill 100 may be combined into a stack such that the thickness of the stack may be less than one and seven eighths of an inch. In this way, the parts of portable grill 100 may be compactly stacked on top of one another and placed into a portable case, such as portable case 700. It should be noted that the aforementioned dimensions are disclosed for certain embodiments of portable grill 100. Though compactness and portability are considered in the design of portable grill 100, so is ease of assembly. As such, other embodiments of portable grill 100 may comprise different dimensions but have the same ease of assembly.

As mentioned above, portable grill 100, in its dissembled state, may fit into portable case 700 as shown in FIG. 7. Portable case 700 may store and transport portable grill 100 in a compartment 710. Portable case 700 may be approximately 19 and one quarter inches in width, 19 and one half inches in height, and one and seven eighths inches in depth, though dimensions may vary and are not to be construed as limiting the various embodiments described herein.

Consistent with various embodiments, portable case 700 may also store skewers in compartment 720 and/or a grill surface to be used in conjunction with portable grill 100 in compartment 710. Furthermore, in various embodiments, portable case 700 may be used as a table on which portable grill 100 may be used. It should be noted that FIG. 7 illustrates one embodiment of portable case 700. Various other embodiments may, for example, exclude compartment 720. Any materials suitable, such as wood, to store and transport portable grill 100 may be used for portable case 700.

Portable grill 100 may be quickly assembled from its dissembled state. For example, with built-in protrusions 110 and holes 120, walls I, II, and II of portable grill 100 may fit together in such a way that would not require tools to secure their standing position. Though protrusions 110 are illustrated to be attached to walls I and II and holes are illustrated in wall III, various embodiments may have protrusions 110 attached to walls III with holes in walls I and II. Furthermore, in various other embodiments, protrusion and holes may be designed in an alternating fashion, such that each wall comprises both at least one protraction 110 and at least one hole 120. Protrusion 110 is discussed in greater detail with reference to FIGS. 2a-2d.

Figure 1B:
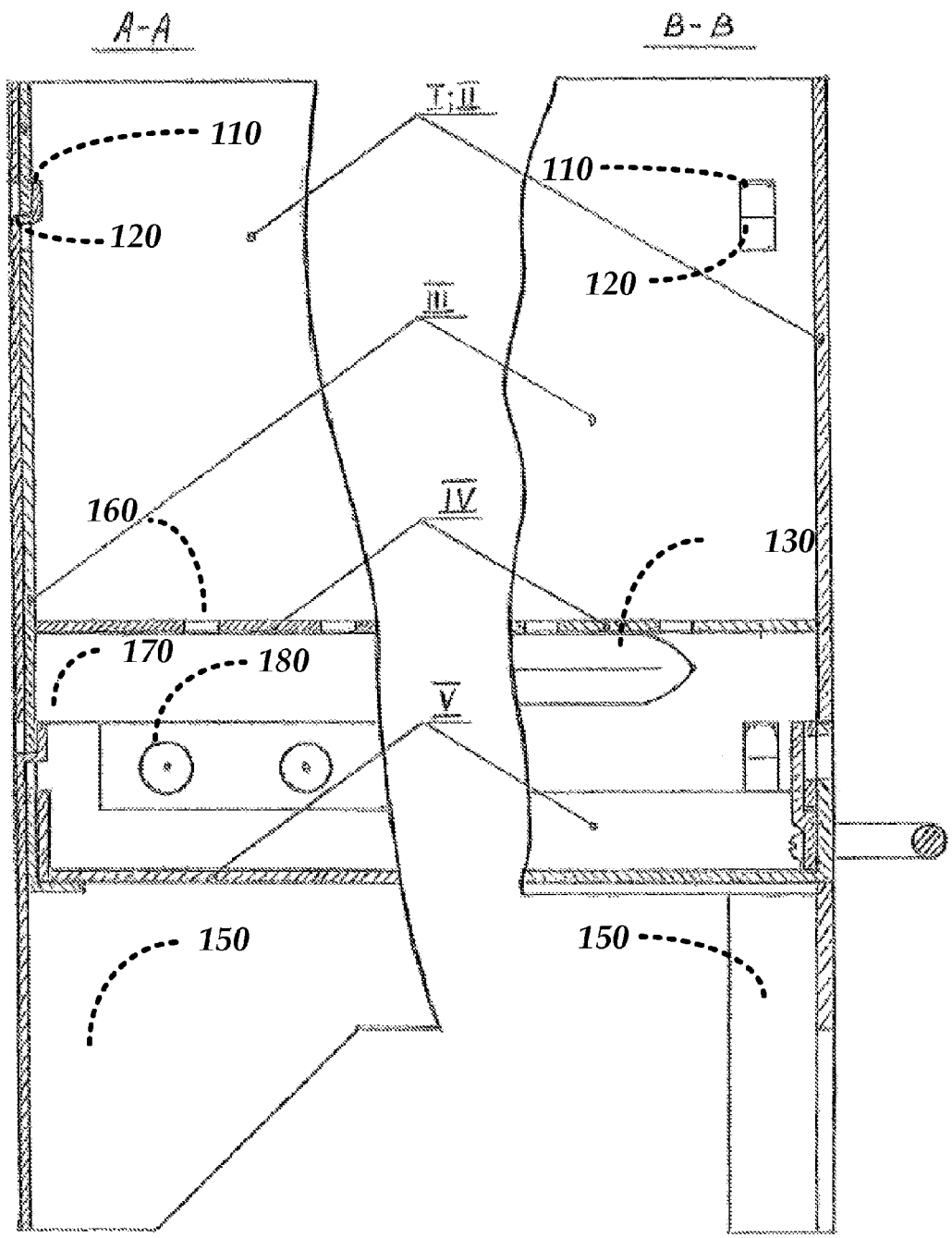

FIG. 1b depicts a cross sectional view A-A corresponding to a viewpoint from the perspective of arrows A-A in FIG. 1a and a cross sectional view B-B corresponding to a viewpoint from the perspective of arrows B-B in FIG. 1a. It should be understood that FIG. 1b is not drawn to exact scale.

Possible embodiments of walls I and II are illustrated in FIGS. 2a and 2b. Both walls I and II may comprise protrusions 110 and legs 150. In the illustrated embodiments, walls I and II each comprise four symmetrically placed protrusions and two legs. However, the quantity and placement of protrusions 110 may vary in various embodiments. Moreover, in various embodiments, the style and quantity of legs 150 may vary not only in proportion, but they may be designed in conjunction with wall III rather than walls I and II.

One possible variation between wall I and wall II is that one of walls I and II may comprise cut-out 170. FIG. 2a illustrates wall I with cut-out 170. Cut-out 170 may be used as an insert for slide V. As mentioned above, any of walls I, II, and III may comprise a cutout for slide V. Similarly, ventilation mechanism 180 may be built into any of walls I, II, and III so as to be independent from slide V. Again, the dimensions and proportions shown in FIGS. 2a and 2b may vary and are not to be construed as limiting in the design of portable grill 100. Rather, they are shown as possible embodiments of portable grill 100.

Figure 2D:
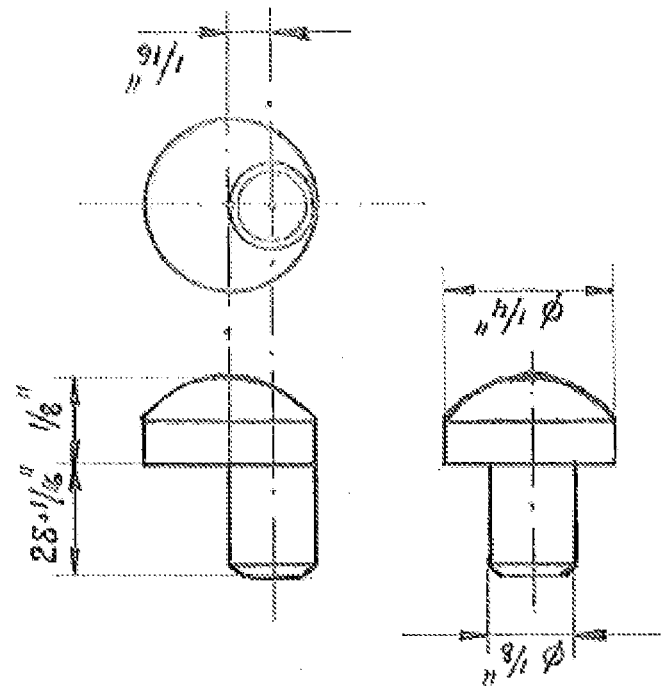

FIG. 2c illustrates a detailed view of one embodiment of protrusion 110. Detailed view A is shown from the prospective of arrow A in FIG. 2a. Any suitable manufacturing process may be used to create protrusion 110. For example, as shown in FIG. 2d, protrusion 110 may be designed as an attachable component to walls I and II. In other embodiments, and as illustrated by FIG. 2c, protrusion 110 may be a continuous part of walls I and II. Alternatively, in various embodiments where walls I and II may comprise holes 120, protrusion 110 may be designed to wall III. Either way, protrusion 110 may serve as a 'hook' that may clip into hole 120 of an adjacent wall. In this way, portable grill 100 may be easily assembled and dissembled.

Figure 3:
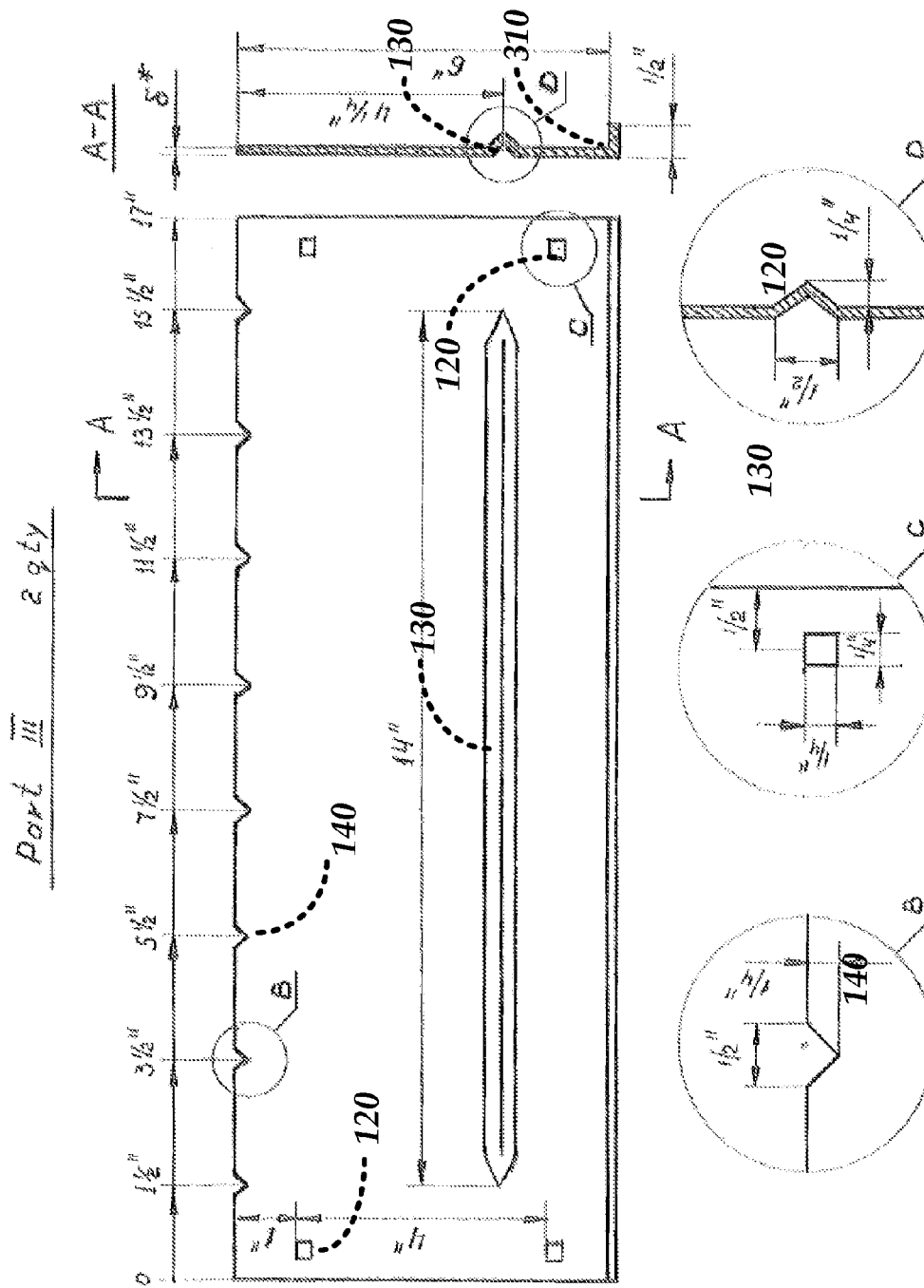
FIG. 3 illustrates a side wall of the portable grill.
Figure 6A:
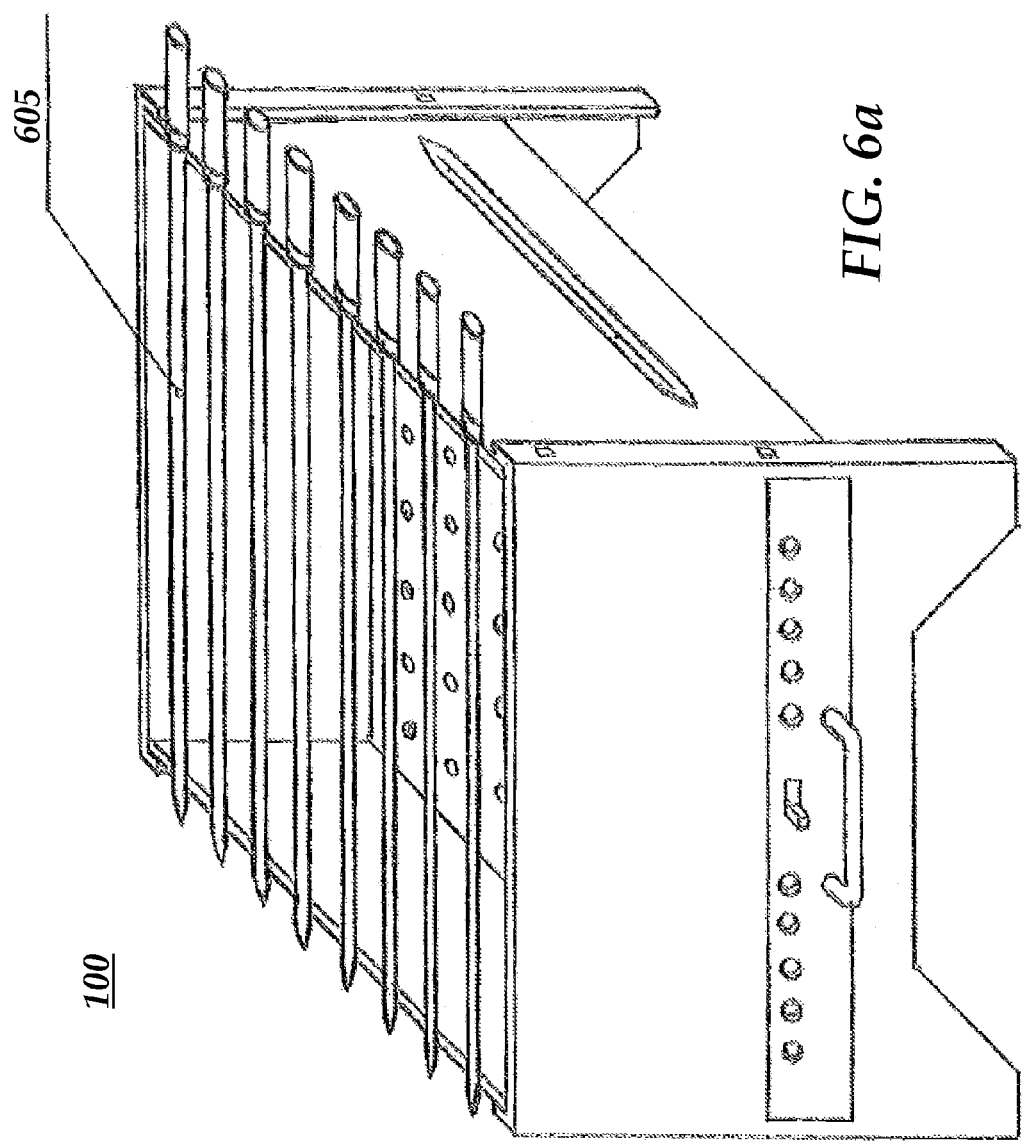

As shown in FIG. 3, wall III may comprise an indentation 130 and grooves 140. Grooves 140 may be used as a placement for skewers 605, as shown in FIG. 6a, or a grill surface 610, as show in FIG. 6b. Moreover, in various embodiments, grooves 140 may be designed in such a way that a skewer may be placed in eight different positions. For example, a flat blade skewer may be placed i) vertically down the middle of a groove (in various embodiment, grooves 140 may comprise an additional hole with a thickness of approximately one skewer blade at the center of each groove to support the vertical placement of the skewer), ii) horizontally across both edges of each groove, iii) laying against a right edge of a groove, and iv) laying against a left edge of a groove. In each of these positions, the skewer may be rotated 180 degrees thereby creating eight different variations of skewer placement. In this way, various sides of a skewer may be exposed to the interior of portable grill 100.

Indentation 130 in wall III may be used as both structural support to maintain the sturdiness of portable grill 100 as well as a resting base for a platform IV. Indentation 130 may protrude from wall III towards the interior of portable grill 100. Indentation 130 may be a physical bend in wall III or, alternatively, may be an attachment to wall III. It should be noted that, though wall III is illustrated to be longer than walls I and II, various embodiments of portable grill 100 may be designed so that walls I and II are longer than wall III. Moreover, though walls I and II are illustrated to comprise legs 150, legs 150 may be designed on wall III in various embodiments of portable grill 100. Similarly, indentation 130 may optionally be included in either or both walls I and II, serving as a structural support and/or a resting base for platform IV. Moreover, wall III may comprise a ledge 310 for supporting slide V when slide V is inserted into the interior of the portable grill 100.

Figure 4:
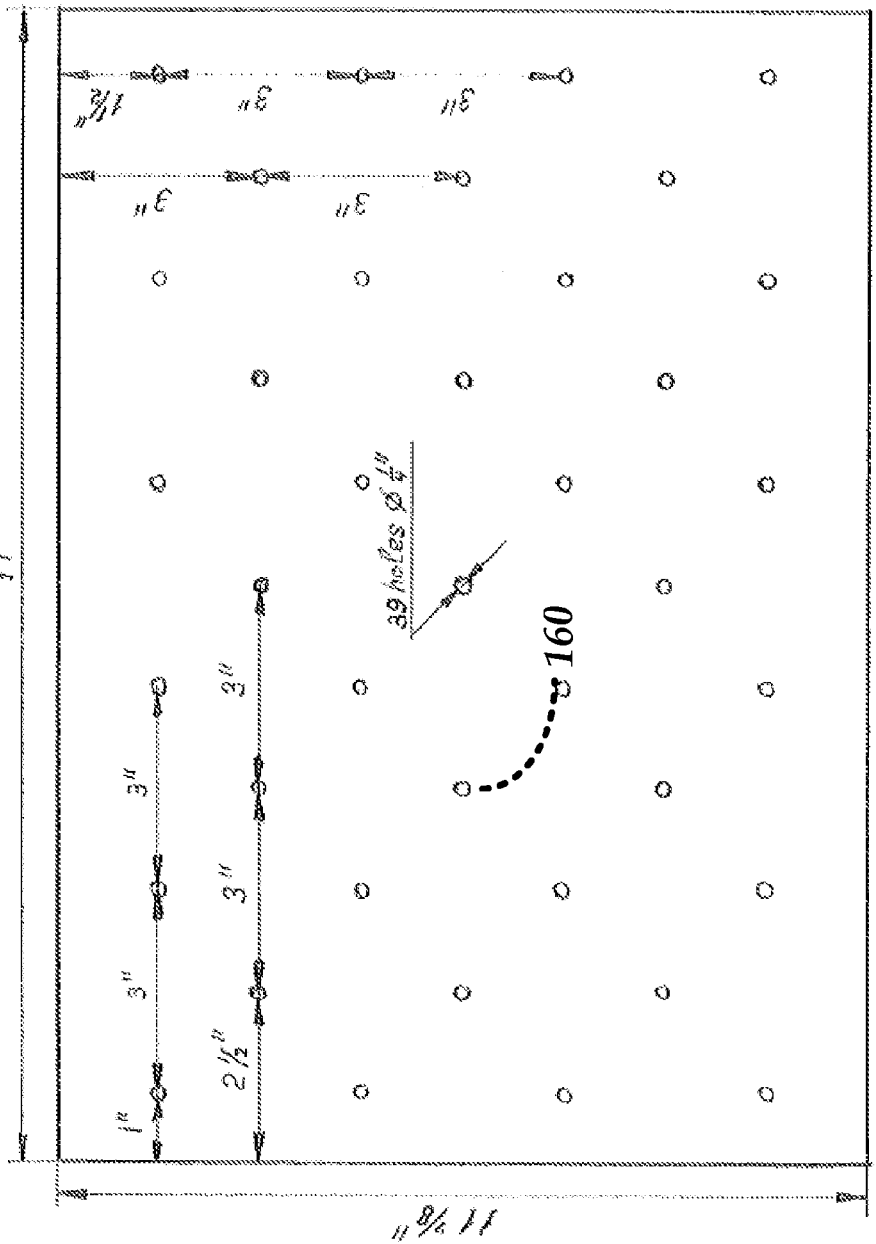
FIG. 4 illustrates a platform of the portable grill.

Referring now to FIG. 4, platform IV may be used as a platform to hold, for example, coals, firewood, or any other substance that may be used for grilling. It may be easily placed and removed from the inside of portable grill 100. As mentioned above, platform IV may rest on indentations 130 in wall III. In this way, once walls I, II, and III are connected via protrusions 110 and holes 120, platform IV may be inserted inside portable grill 100 and use indentations 130 as its resting base. Platform IV may comprise holes 160. Filtering holes 160 within platform IV may be used to pass ash down to a slide V.

Figure 5C:
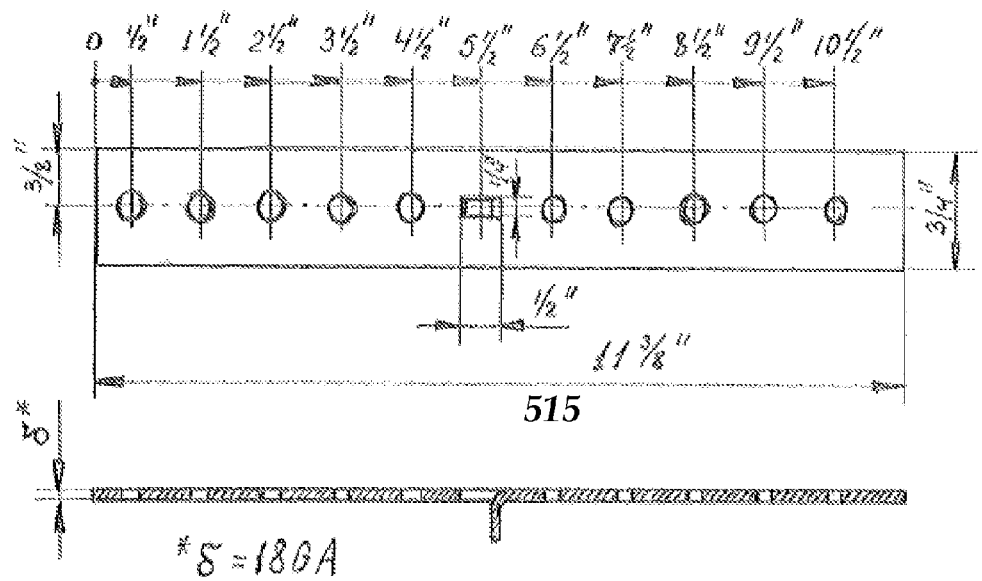
Figure 5C:
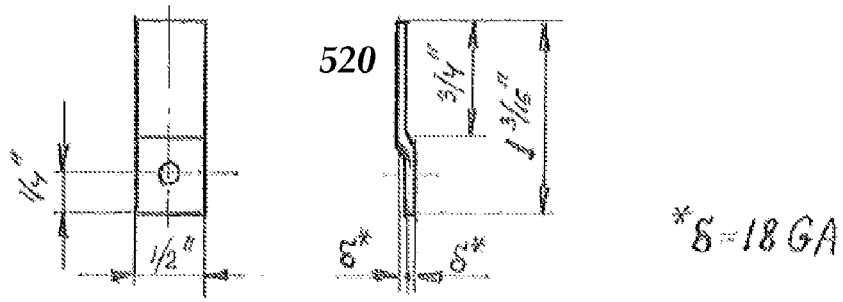
Figure 5C:
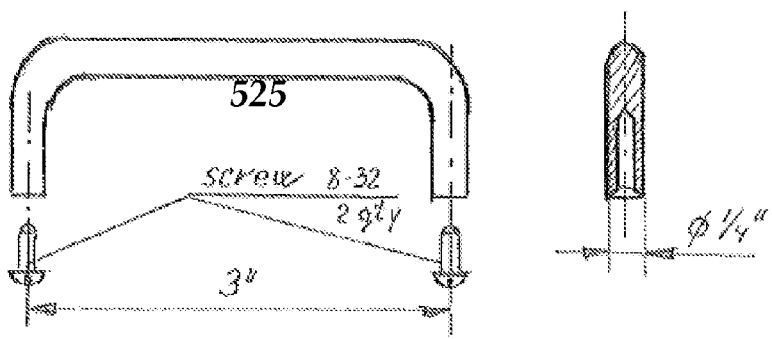
Figure 5D:
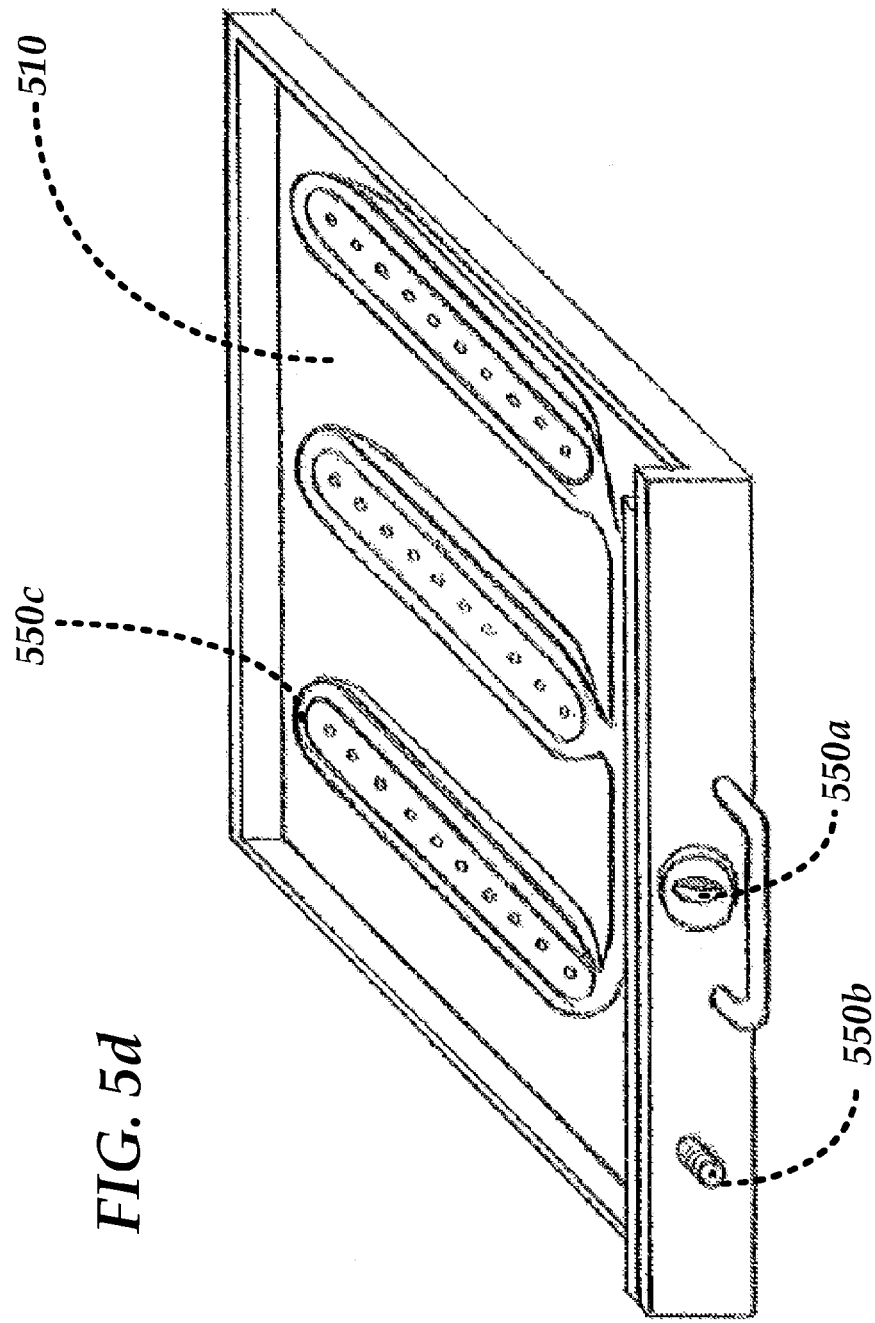

FIG. 5a shows one embodiment of slide V having a tray 510, a ventilation slide 515, ventilation clamps 520, and a handle 525. Slide V may also be referred to as an insertable tray. Slide V may slide in and out of cut-out 170 in wall I using, for example, handle 525, though handle 525 may not be included in various embodiments. Slide V may comprise tray 510, as detailed in FIG. 5b, for collecting ash or debris that is passed through filtering holes 160 of platform IV. In this way, slide V may be inserted into cut-out 170, collect ash and debris passed through platform IV, and subsequently be removed in order to, for example, discard the collected ash and debris. In various other embodiments, and as illustrated in FIG. 5d, slide V may be configured with a gas interface 550, including a valve 550a, a gas insert 550b, and gas releasing mechanism 550c. In this way, portable grill 100 may be used as gas grill. Platform IV may be optionally used in conjunction with the gas implementation of portable grill 100.

Furthermore, in various embodiments, slide V may comprise an adjustable ventilation mechanism 180. In various other embodiments, ventilation mechanism 180 need not be attached to slide V, and slide V need not be attached to wall I. Rather, portable grill 100 may be designed so that slide V may fit into any of walls I, II, or III. Moreover, ventilation mechanism may be built into any of the walls I, II, or III instead of slide V. FIG. 5b shows ventilation mechanism 180 as attached to slide V. Regardless to what portion of portable grill 100 the ventilation mechanism 180 is attached, ventilation mechanism 180 may be positioned below platform IV and comprise at least one ventilation hole 505. In this way, oxygen may be provided to the interior of portable grill from, for example, below platform IV. The amount of oxygen exposure at least one ventilation hole 505 provides to the interior of portable grill 100 may be adjusted by ventilation slide 515. Ventilation slide 515 may be attached the ventilation mechanism 180 by clamps 520. By adjusting a positioning of ventilation slide 515 relative to ventilation mechanism 180, the amount of oxygen at least one ventilation hole 505 exposes to the interior of portable grill 100 may be controlled. FIG. 5c details ventilation slide 515, clamps 520, and handle 525.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

What is claimed is:
1. A portable grill comprising:
a first wall comprising a first hook on a first side of the first wall and a second hook on a second side of the first wall;
a second wall comprising a third hook on a first side of the second wall, a fourth hook on a second side of the second wall, and a cut-out at a lower portion of the second wall;
a third wall comprising a first hole on a first side of the third wall, a second hole on a second side of the third wall, and wherein a bottom edge of the third wall forms a first ledge;
a fourth wall comprising a third hole on a first side of the fourth wall, a fourth hole on a second side of the fourth wall, and wherein a bottom edge of the fourth wall forms a second ledge;
wherein the first wall is configured to connect to the third wall and the fourth wall and wherein the second wall is configured to connect to the third wall and the fourth wall to form a rectangular structure having the first ledge of the third wall and the second ledge of the fourth wall at a position approximately level to a bottom edge of the cut-out of the second wall; and
a tray configured to be inserted into the cut-out of the rectangular structure and serve as a removable base for the rectangular structure, wherein the tray, when inserted into the cut-out, is configured to rest on the first ledge of the third wall and the second ledge of the fourth wall.

2. The portable grill of claim 1, further comprising a portable case for storing at least one of the following: the first wall, the second wall, the third wall, and the tray.

3. The portable grill of claim 1, wherein the third wall comprises at least one first groove at a top edge of the third wall and wherein the fourth wall comprises at least one second groove at a top edge of the fourth wall, wherein the at least one first groove and the at least one second groove are configured to support at least one of the following: a skewer and a grilling surface.

4. The portable grill of claim 3, wherein the at least one first groove and the at least one second are configured to support the skewer in at least one of the following:
   a horizontal positioning of the skewer,
   an angled positioning of the skewer, and
   a vertical positioning of the skewer.

5. The portable grill of claim 1, wherein the tray is configured with a gas interface.

6. The portable grill of claim 1, wherein a combined width of the first wall and the second wall is approximately equal to a length of at least one of the following: the third wall, the platform, and the tray.

7. The portable grill of claim 1, further comprising: at least one adjustable ventilation hole built into at least one of the following: the first wall, the second wall, the third wall, and the tray, wherein the at least one adjustable ventilation hole is built with an adjustable slide enabled to variably cover the at least one adjustable ventilation hole.

8. The portable grill of claim 1, wherein the rectangular structure is configured to be formed by:
   the first hook of the first wall connecting to the first hole of the third wall,
   the second hook of the first wall connecting to the third hole of the fourth wall,
   the third hook of the second wall connecting to the second hole of the third wall, and
   the fourth hook of the second wall connecting to the fourth hole of the fourth wall.

9. The portable grill of claim 1, further comprising a platform, wherein the platform is configured to be placed into an interior of the rectangular structure above a position of the cut-out.

10. The portable grill of claim 9, wherein the cut-out is positioned such that the tray is configured to be inserted into the interior of the rectangular structure below the platform.

11. The portable grill of claim 9, further comprising at least one adjustable ventilation hole positioned below the resting place of the platform.

12. A portable grill comprising:
   a first wall comprising:
      at least one first protrusion at a first end of the first wall,
      at least one second protrusion at a second end of the first wall, and
      a cut-out, wherein a bottom portion of the first wall comprises a first pair of legs, and wherein the cut-out is positioned above the bottom portion;
   a second wall comprising:
      at least one third protrusion at a first end of the second wall, and
      at least one fourth protrusion at a second end of the second wall, wherein a bottom portion of the second wall comprises a second pair of legs;
   a third wall comprising:
      at least one first hole at a first end of the third wall,
      at least second hole at a second end of the third wall,
      at least one first groove at a top end of the third wall, and
      a first indentation positioned at approximately a mid-portion of the third wall;
   a fourth wall comprising:
      at least one third hole at a first end of the fourth wall,
      at least one fourth hole at a second end of the fourth wall,
      at least one second groove at a top end of the fourth wall, and
      a second indentation positioned at approximately a mid-portion of the fourth wall;
   a platform comprising a plurality of holes;
   an insertable tray; and
   wherein the first wall is configured to be connected to the third wall and the fourth wall by a connection of the at least one first protrusion of the first wall to the at least one first hole of the third wall and a connection of the at least one second protrusion of the first wall to the at least one third hole of the fourth wall,
   wherein the second wall is configured to be connected to the third wall and the fourth wall by a connection of the at least one third protrusion of the second wall to the at least one second hole of the third wall and a connection of the at least one fourth protrusion of the second wall to the at least one fourth hole of the fourth wall,
   wherein a connection of the first wall with the third wall and the fourth wall and a connection of the second wall with the third wall and the fourth wall is configured to form a rectangular structure having:
      the first wall in parallel to the second wall,
      the third wall in parallel to the fourth wall, wherein a bottom edge of the third wall and a bottom edge of the fourth wall are positioned, in the rectangular structure, at a level above the bottom portion of the first wall and the bottom portion of the second wall,
      the first indentation of the third wall facing, at a first even level, the second indentation of the fourth wall, and
      the at least one first groove and the at least one second groove positioned at a top of the rectangular structure at a second even level,
   wherein the rectangular structure is configured to support the platform in an interior of the rectangular structure such that the platform rests on the first indentation and the second indentation at the first even level, and
   wherein the cut-out of the first wall is positioned below the first even level of the first indentation and the second indentation and is configured to receive the insertable tray such that the insertable tray is insertable into the interior of the rectangular structure through the cut-out into a position:
      below the platform, and
      above the first pair of legs and the second pair of legs.

13. The portable grill of claim 12, wherein the insertable tray comprises a gas interface.

14. The portable grill of claim 12, wherein the third wall further comprises a first bottom ledge, wherein the fourth wall further comprises a second bottom ledge, wherein the first bottom ledge and the second bottom ledge are configured to face each other at a third even level in the rectangular structure, and wherein the insertable tray is configured to rest on the first bottom ledge and the second bottom ledge when within the interior of the rectangular structure at the position below the platform.

15. The portable grill of claim 12, wherein the at least one adjustable ventilation hole is positioned below the resting place of the platform in the interior of the portable grill.

16. The portable grill of claim 12, wherein a combined width of the first wall and the second wall is approximately equal to a length of at least one of the following: the third wall, the platform, and the tray.

17. The portable grill of claim 12, wherein the at least one adjustable ventilation hole is built with an adjustable slide enabled to variably cover the at least one adjustable ventilation hole.

18. A portable grill comprising:
- a first wall comprising a first protrusion along a first edge of the first wall, a second protrusion along a second edge of the first wall, an upper portion, a cut-out, and a lower portion, wherein the cut-out of the first wall is above the lower portion, and wherein the lower portion comprises a first pair of legs;
- a second wall comprising a third protrusion along a first edge of the second wall, a fourth protrusion along a second edge of the second wall, an upper portion, and a lower portion comprising a first pair of legs;
- a third wall comprising a first hole along a first edge of the third wall, a second hole along a second edge of the third wall, a first indentation at a mid-portion of the third wall and at least one first groove on a top edge of the third wall, and a first ledge running along a bottom edge of the third wall;
- a fourth wall comprising a third hole at a first edge of the fourth wall, a fourth hole at a second edge of the fourth wall, a second indentation at a mid-portion of the fourth wall and at least one second groove of a top edge of the fourth wall, and a second ledge running along a bottom edge of the fourth wall;
- wherein the first wall, second wall, third wall, and fourth wall are configured to be connected into a rectangular structure with:
  - the first wall approximately parallel to the second wall, and
  - the third wall approximately parallel to the fourth wall such that the first ledge of the third wall and the second ledge of the fourth wall are positioned, in the rectangular structure, approximately above the lower portion of the first wall and the lower portion of the second wall, and the first indentation of the third wall and the second indentation of the fourth wall are positioned, in the rectangular structure, approximately above the cut-out;
- a slide configured to be inserted into the cut-out, wherein a bottom portion of the slide is configured to rest on the first ledge of the third wall and the second ledge of the fourth wall when the slide is inserted into the cut-out in the rectangular structure; and
- a platform configured to be rest on the first indentation of the third wall and the second indentation of the fourth wall.

19. The portable grill of claim 18, wherein the slide is configured to serve as a detachable base to the rectangular structure when inserted into the cut-out.

20. The portable grill of claim 18, wherein each component of the portable grill is configured to be assembled and disassembled without the aid of tools.

\* \* \* \* \*